June 8, 1965   R. M. EVENSON   3,187,586
GYROSCOPE OIL CONTROL SYSTEM
Filed July 19, 1962   2 Sheets-Sheet 1

INVENTOR.
Raymond M. Evenson
BY
Paul J. Ellington
ATTORNEY

June 8, 1965     R. M. EVENSON     3,187,586
GYROSCOPE OIL CONTROL SYSTEM
Filed July 19, 1962     2 Sheets-Sheet 2
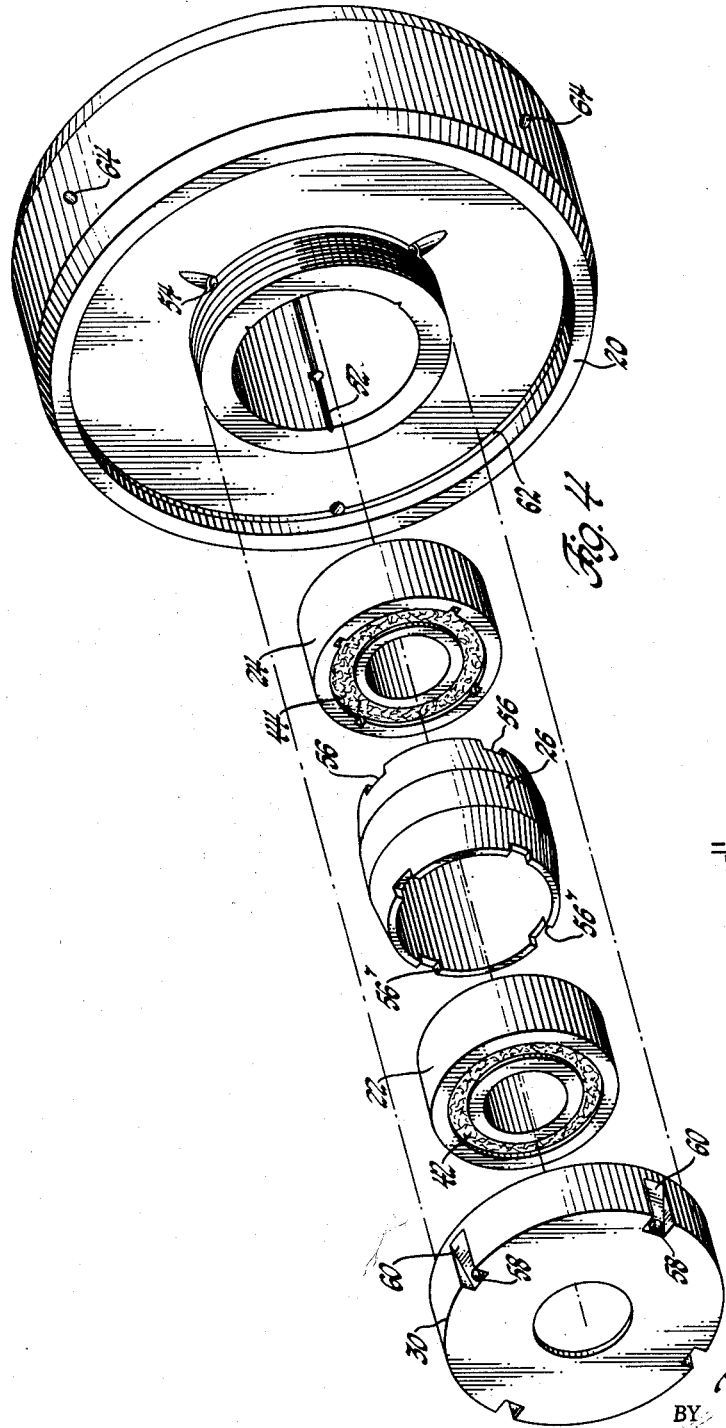
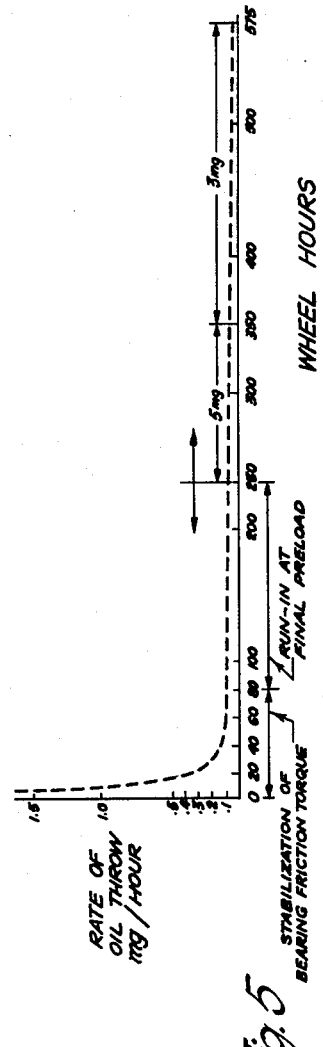
INVENTOR.
Raymond M. Evenson
BY
Paul J. Ethington
ATTORNEY

United States Patent Office 3,187,586
Patented June 8, 1965

3,187,586
GYROSCOPE OIL CONTROL SYSTEM
Raymond M. Evenson, Waukesha, Wis., assignor to General Motors Corporation, Detroit, Mich., a corporation of Delaware
Filed July 19, 1962, Ser. No. 210,918
3 Claims. (Cl. 74—5)

This invention relates to gyroscopes and more particularly to a system for controlling the distribution of lubricating oil from the spin axis bearings.

In precision gyroscopes, such as those used for stabilization in inertial guidance systems, very slight disturbances may cause significant errors in the gyroscope output. Such gyroscopes are usually the single-degree of freedom type with a floated inner gimbal assembly containing the gyro wheel mounted on bearings for rotation about the spin axis. It is known that excessive lubricating oil on the spin axis bearings may result in random oil motion within the gimbal and produce disturbances affecting the accuracy of the instrument. It particular, it has been found that improper control of excess lubricating oil results in erratic mass shifts which upset the extremely critical balance of the gimbal about the output axis of the gyroscope. Another disturbance commonly referred to as a "jog" is believed to be attributable, at least in part, to oil surplus. The jog occurs when a droplet of oil is flung from the ball separator into the outer race and presents an oil-mass obstacle in the path of the balls of the spin axis bearing. Furthermore, a continuous surplus of oil in a bearing outer race results in a high level of bearing friction torque and thus requires additional motor torque with an associated increase of heat dissipation within the gimbal.

In accordance with this invention, excess oil from the spin axis bearings is controlled in a manner to prevent or minimize the aforementioned disturbances. This is accomplished by providing an oil distribution system leading from the spin axis bearings through the gyro wheel to the internal surface of the gimbal. The centrifugal force of wheel rotation causes flow of the lubricating oil to the rim of the wheel and causes oil slinging from the wheel rim to the gimbal. Since only a very minute quantity of lubricating oil is desired on the bearings during operation of the gyroscope, the major part of the surplus oil is eliminated during the run-in period of the bearings prior to sealing of the gimbal. After the gimbal is sealed and during operation of the gyroscope, additional excess oil is removed from the bearings through the distribution system to the gimbal where it is spread in a thin film in a manner so that the center of gravity of the oil is the same as in its original location in the bearings.

A more complete understanding of the invention may be had from the detailed description which follows taken with the accompanying drawings in which:

FIGURE 4 is an exploded view of the gyroscope wheel assembly; and

FIGURE 5 is a graphical representation showing the oil removal rate as a function of run-in time.

Figure 1:
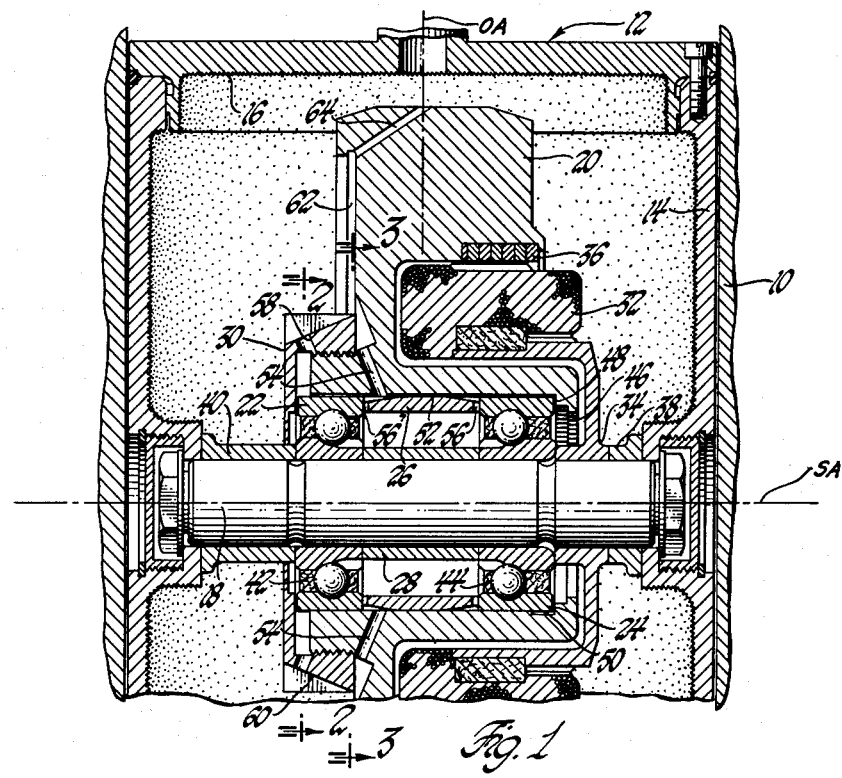
FIGURE 1 is a sectional view, partially cut-away, of a single degree of freedom gyroscope including the inventive oil control system.
Figures 2, 3:
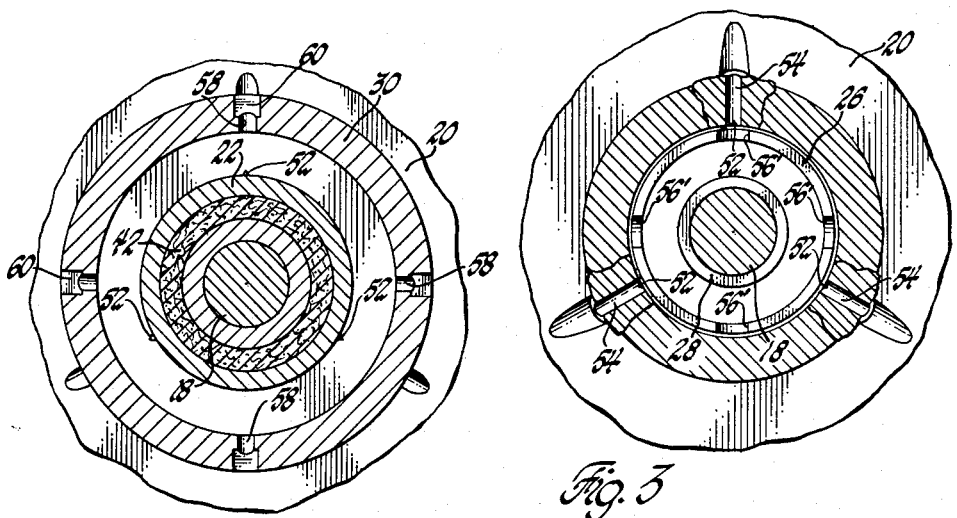
FIGURE 2 is a sectional view taken on lines 2—2 of FIGURE 1.
FIGURE 3 is a sectional view taken on lines 3—3 of FIGURE 1.

Referring now to the drawings, there is shown an illustrative embodiment of the invention in a single degree of freedom gyroscope with a floated gimbal assembly and provided with an oil control system which is effective during the run-in period and during subsequent gyroscope operation. The gyroscope in which the oil control system is provided is of a well known type, such as that shown in the Jarosh et al. Patent 2,752,791, and for the sake of clarity, it is not shown in its entirety and will not be described in detail herein.

Considering first the general arrangement of the gyroscope, it comprises a casing 10 which defines a cylindrical chamber within which is disposed a gimbal assembly 12. The gimbal assembly is mounted for rotation about an output axis OA by suitable bearings, not shown, and comprises a cylindrical float 14 which is supported in substantially neutral buoyancy by a floatation liquid filling the space between the gimbal assembly and the casing. The cylindrical float is provided at both ends with a removable end plate 16 which forms a fluid tight seal after final assembly. The float supports a stationary shaft 18 extending transversely and defining the spin axis SA of the gyroscope. The gyroscope wheel 20 is rotatably mounted upon the shaft 18 by a pair of spin axis ball bearings 22 and 24. The outer races of the bearings are non-rotatably mounted within the hub of the gyroscope wheel and are spaced apart by an outer race spacer 26. The inner races are non-rotatably supported upon the shaft 18 and are spaced apart by an inner race spacer 28. A retaining ring 30 is mounted by a threaded flange onto the hub of the gyroscope wheel and engages the left end of the outer race of bearing 22.

To impart rotation to the gyroscope wheel, there is provided a hysteresis motor which includes a stator 32 non-rotatably mounted upon the shaft 18 by a hub 34. The gyroscope wheel constitutes the rotor of the hysteresis motor and is provided with a hysteresis ring 36. A spacer sleeve 38 is interposed between the hub 34 of the stator and the adjacent mounting boss of the gimbal. Similarly, a spacer sleeve 40 is disposed between the inner race of bearing 22 and the adjacent mounting boss of the gimbal.

Lubrication for the spin axis bearings 22 and 24 is provided by oil impregnated ball separators 42 and 44 which are constructed in a known manner of porous material, such as fiber or sintered nylon. Since optimum lubrication of the bearings is achieved with a very minute quantity of oil, the separators may be centrifuged prior to assembly of the bearings. However, the separators retain a substantially larger quantity of oil than is desirable and in accordance with this invention, the excess oil is removed from the bearings and the gyroscope wheel during the gyro run-in period and during the period of gyroscope operation. With the gyroscope motor energized and the wheel rotating at high speed, the oil in the ball separators migrates outwardly due to centrifugal force and reaches the outer races of the respective bearings. In order to remove the oil from the outer races of bearings, an oil flow path is provided on both ends of each outer race. The flow path from the right end of the bearing 24 outer race includes a reservoir 46 formed in the flange of the wheel hub to collect the oil migrating laterally from the separator 44. Communicating with the reservoir 46 are three radially extending grooves 48 which feed the oil to an annular header 50 formed by an undercut in the wheel hub. The inner surface of the wheel hub is provided with three equally spaced grooves 52 connecting the header 50 with three passages 54 extending obliquely through the wheel hub. The flow path for the oil migrating from the left side of the separator 44 to the outer race of bearing 24 includes four equally spaced notches 56 in the right end of the outer race spacer 26. The outer surface of the spacer 26 is chamfered at both ends to provide for flow paths extending from notches 56 and 56' to the axial grooves 52 in the wheel hub. The grooves 52 communicate directly with the oblique passages 54.

The flow path for the oil migrating from the right end of the separator 42 of bearing 22 includes four equally spaced notches 56' in the left end of the outer race spacer 26 and the grooves 52 which are connected with the oblique passages 54. The flow path for the oil migrating from the lefthand end of ball separator 42 extends outwardly between the outer race of bearing 22 and the retainer 30. The retainer is provided with four equally spaced passages 58 extending obliquely through the flange to corresponding ramp surfaces 60 which register at their outer ends with the outer end of oblique passages 54.

The face of the wheel 20 serves as a flow path from the outer ends of the oblique passages 54 and from ramp surfaces 60 to an annular reservoir 62 formed as an undercut in the rim of the wheel. The rim of the wheel 20 is provided with three equally spaced passages 64 extending obliquely from the reservoir 62 to outlets at the periphery of the wheel. The outlets of passages 64 are in a plane which is midway between the ball separators 42 and 44 and thus the oil is flung off the wheel so that its center of gravity is located in the same plane as the center of gravity of the oil when it was in the ball separators. The inner surface of the float, including end plates, is provided with a matte finish by vapor or sand blasting or the like to permit oil which is flung from the wheel to spread uniformly by capillary action in a thin film over the gimbal surface.

With the gyro wheel spinning at its rated speed of 12,000 r.p.m., the oil migrates out of the separators under the influence of about 1,680 "g's" and is accelerated radially outward by a force approaching 2,000 g's through the passages 54 in the hub of the wheel. The oil from the left side of the separator 42 leaks between the outer race and the retainer and enters passages 58 to the ramp 60. Even though the acceleration forces are high, the oil does not fling off the ramp surfaces because of the surface tension; instead, it flows up the ramp to the face of the wheel. All of the oil thrown off both bearings travels outwardly along the face of the wheel to the annular reservoir in the rim of the wheel and thence through the passage 64 to the peripheral outlets. The oil is flung from the outlets in tiny droplets under force of about 6,900 g's onto the inner surfaces of the float. The outlets in passages 64 lie in a plane perpendicular to the spin axis through the approximate center of gravity of the oil sources, i.e., the ball separators. The oil throw from the outlets is diametrically symmetrical and hence, with uniform spreading on the internal surfaces of the float, the center of gravity of the oil remains unchanged from its original position in the ball separators. Consequently, the balance of the float is not disturbed by the oil control system.

As shown in FIGURE 5, the rate of oil throw is initially very high and most of the excess oil is removed during the run-in period. With an initial oil supply in the ball separators of 100 milligrams, the initial rate of throw is about 11 milligrams per hour. The oil control system obviates the need for high $g$ centrifuging of the ball separators prior to bearing assembly and the bearings are provided with maximum oil during the initial run-in period of about 80 hours during which the bearing friction torque is stabilized. At this point, the rate of oil throw is decreased to slightly more than $\frac{1}{10}$ milligram per hour and continues to decrease during the remainder of the run-in period, during which the bearing preload is established at its final value. After a run-in period of about 230 hours, the oil is removed from the internal surfaces of the float before it is sealed and the gyroscope is finally assembled. About 42 milligrams of oil is thus removed during the run-in period. With the gyroscope in operation during the calibration period and subsequently, additional oil will be flung off as indicated in FIGURE 5 and will be distributed over the inner surface of the float. Because of the small quantity of oil throw and its distribution, as previously described, this accumulation of oil on the float will not produce any significant unbalance in the gyro float.

Although the description of this invention had been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. In a gyroscope of the type including a casing, a gimbal assembly including a cylindrical float having trunnions supported by the casing for rotation about an output axis, a shaft non-rotatably mounted within said float transversely of said output axis and defining a gyroscope spin axis, bearing means mounted on said shaft, a gyroscope wheel having a rim and a hub interconnected by a wheel flange, said hub being mounted on the bearing means, motor means supported by the float for imparting high speed rotation to the wheel, an excessive quantity of lubricating oil in said bearing means, said wheel hub, flange and rim defining at least one passage extending from said bearing means to the periphery of said rim whereby centrifugal force causes the excess oil in said bearing means to flow outwardly through said passage and to be thrown from the periphery of the wheel against the internal surface of the float, said passage terminating at the periphery of the wheel in a plane perpendicular to the spin axis and passing through the center of gravity of the lubricating oil in its original location in said bearing means whereby the balance of the float about the output axis is not disturbed by the distribution of the oil on the float.

2. In a gyroscope of the type including a casing, a gimbal assembly including a cylindrical float having trunnions supported by the casing for rotation about an output axis, a shaft non-rotatably mounted within said float transversely of said output axis and defining a gyroscope spin axis, at least one ball bearing including inner and outer races with plural balls disposed between the races in the pockets of a ball separator, the inner race being mounted on said shaft, a gyroscope wheel having a rim and a hub interconnected by a wheel flange, said hub being mounted on the outer race for rotation about the spin axis, motor means supported by the float for imparting high speed rotation to the whel, said ball separator being constructed of a porous material and impregnated with an excessive quantity of lubricating oil for the bearing, said wheel hub, flange and rim defining at least one passage extending from the outer race of said bearing to an outlet in the periphery of said rim whereby centrifugal force causes the excess oil in said bearing to flow outwardly through said passage and is thrown from the periphery of the wheel against the internal surface of the float, the outlet in the periphery of the wheel being in a plane perpendicular to the spin axis and passing through the center of gravity of the lubricating oil in its original location in the separator whereby the balance of the float about the output axis is not disturbed by the distribution of the oil on the float.

3. In a gyroscope of the type including a casing, a gimbal assembly including a cylindrical float having trunnions supported by the casing for rotation about an output axis, a shaft non-rotatably mounted within said float transversely of said output axis and defining a gyroscope spin axis, a pair of ball bearings each of which includes inner and outer races with plural balls interposed between the races in a ball separator, the inner races of the bearings being mounted on said shaft, a gyroscope wheel having a rim and a hub interconnected by a wheel flange, said hub being mounted on the outer races of the bearings for rotation about the spin axis, an outer race spacer sleeve disposed between said outer races, motor means mounted on the shaft for imparting high speed rotation to the wheel, the ball separators being constructed of a porous material and impregnated with an excessive quantity of lubricating oil for the bearings, the wheel hub defining a passage extending from a point between the outer races of the bearings to one surface of the wheel flange, the inner surface of the wheel hub defining an axial groove extending between the outer races and intersecting said passage, the rim of the wheel defining an annular reservoir and a passage extending from the reservoir to the periphery of the rim and terminating in an outlet whereby the excess oil in said bearings flows outwardly through said passages and said groove and is thrown from the periphery of the wheel, the internal surfaces of said float having a matte finish, said outlet being in a plane perpendicular to the spin axis and passing through the center of gravity of the oil in the ball separators whereby the oil from the outlet spreads in a thin film on the surfaces of the float with the same center of gravity as the oil in the separators.

References Cited by the Examiner
UNITED STATES PATENTS

| | | | |
|---|---|---|---|
| 1,866,733 | 7/32 | Tanner | 74—5.44 X |
| 2,413,285 | 12/46 | Bousky | 74—5.7 |
| 2,782,642 | 2/57 | Beach | 74—5 |

BROUGHTON G. DURHAM, *Primary Examiner.*